Figure 1:
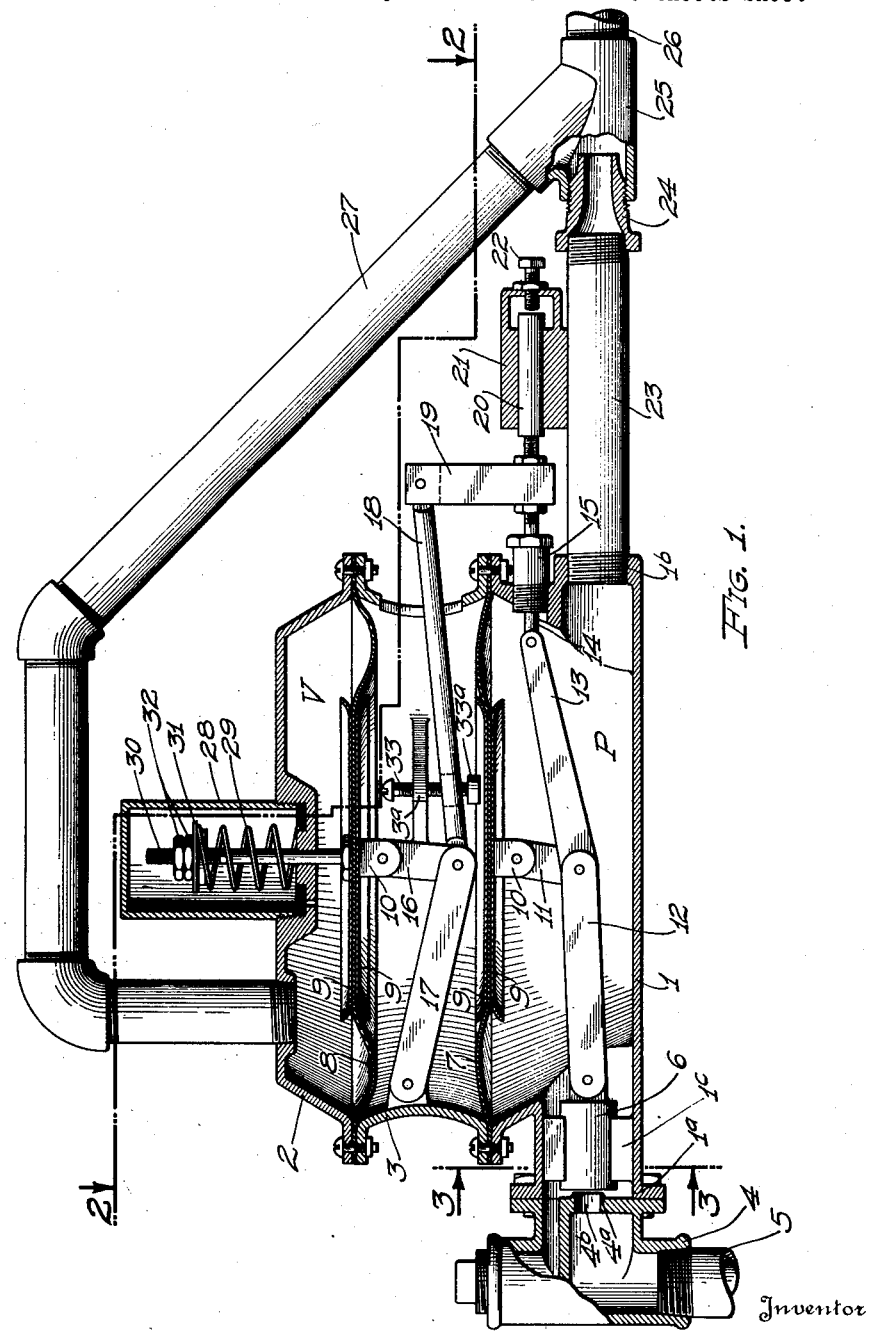

July 31, 1928.  
O. B. GOLDKAMP  
FLUID REGULATOR  
Filed May 19, 1924

1,679,215

5 Sheets-Sheet 1

Inventor  
OTTO B. GOLDKAMP.  
By A. B. Bowman  
Attorney

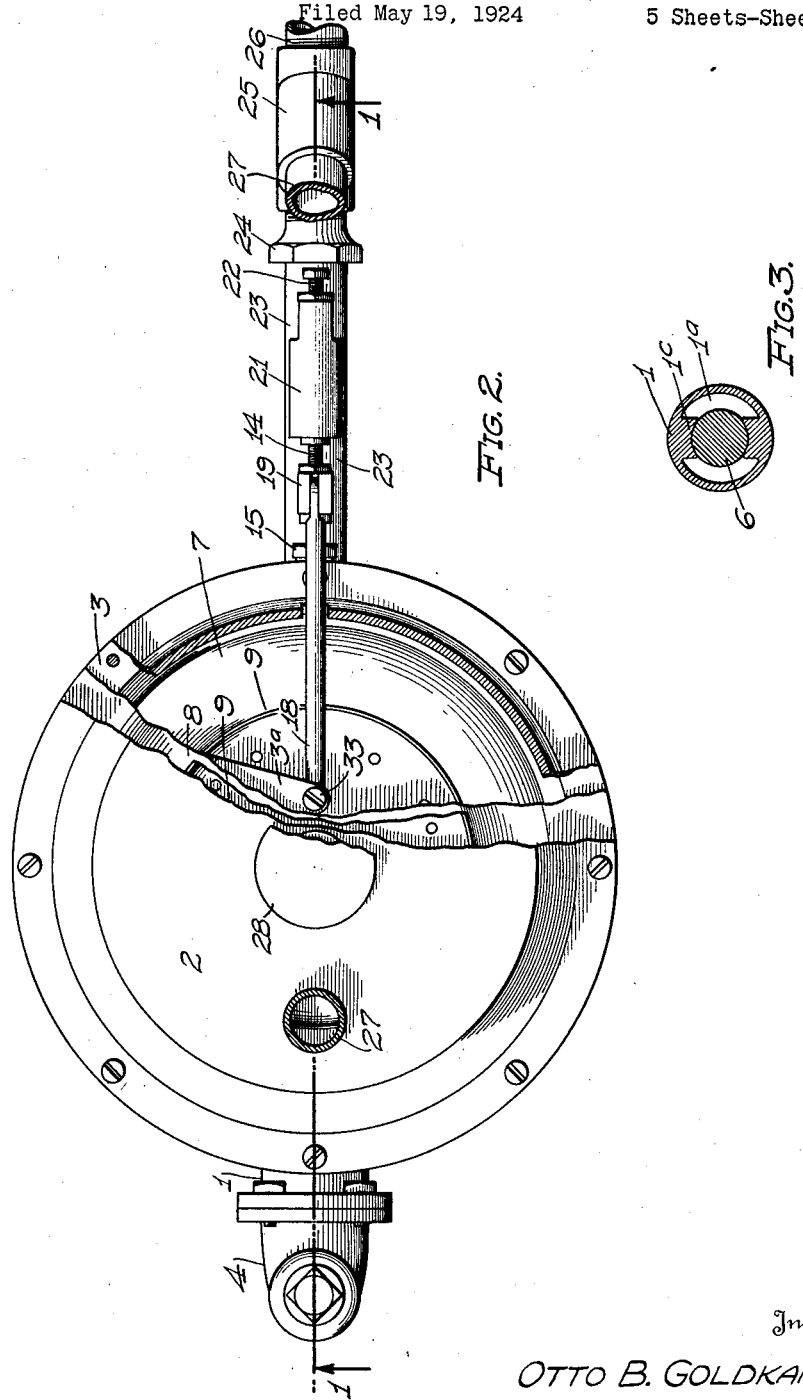

July 31, 1928.

O. B. GOLDKAMP 1,679,215

FLUID REGULATOR

Filed May 19, 1924 5 Sheets-Sheet 3

Inventor
OTTO B. GOLDKAMP.
By A. B. Bowman
Attorney

July 31, 1928.  1,679,215
O. B. GOLDKAMP
FLUID REGULATOR
Filed May 19, 1924     5 Sheets-Sheet 4

Inventor
OTTO B. GOLDKAMP.
By A. B. Bowman
Attorney

July 31, 1928.

O. B. GOLDKAMP 1,679,215

FLUID REGULATOR

Filed May 19, 1924

5 Sheets-Sheet 5

Inventor
OTTO B. GOLDKAMP.

By A. B. Bowman
Attorney

Patented July 31, 1928.

1,679,215

UNITED STATES PATENT OFFICE.

OTTO B. GOLDKAMP, OF SAN DIEGO, CALIFORNIA, ASSIGNOR OF ONE-HALF TO SAN DIEGO CONSOLIDATED GAS AND ELECTRIC COMPANY, OF SAN DIEGO, CALIFORNIA, A CORPORATION OF CALIFORNIA, AND ONE-FOURTH TO SELMAR R. SIEBERT, OF SAN DIEGO, CALIFORNIA.

FLUID REGULATOR.

Application filed May 19, 1924. Serial No. 714,382.

My invention relates to fluid pressure regulators, more particularly adaptable for regulating the pressure and volume of fuel gas in main lines as well as in individual feed lines installed for domestic consumption, and the objects of my invention are: First, to provide a fluid regulator whereby the pressure in main pipe-lines or in individual feed or service lines, in which the regulator is positioned, may be increased or held at a constant pressure as the load factor or consumption increases, instead of being decreased as in the conventional fluid regulators now in use; second, to provide a vacuum and pressure actuated diaphragm in connection with fluid regulators for actuating the discharge valve, the regulation of the valve being dependent upon the velocity of flow of the fluid through the pipe-line with which it is connected; third, to provide a fluid regulator of this class which is provided with an auxiliary diaphragm actuated by the volume of the fluid in the regulator, which diaphragm is adapted to modify the flow of fluid through the discharge valve as the load factor or consumption of the fluid increases; fourth, to provide an auxiliary means, such as a spring, which is adapted to counterbalance, to a certain extent, the weight of the vacuum actuated means of the regulator; fifth, to provide a partial vacuum producing means in connection with a fluid regulator which communicates with a vacuum chamber provided with a diaphragm in the wall thereof, which diaphragm is operatively connected with the discharge valve of the regulator; sixth, to provide an injector means at the discharge portion of the regulator, the outer peripheral portion of said injector means communicating by means of a passage or conductor with said vacuum chamber; seventh, to provide a Y-connection contiguous to the injector means of my fluid regulator; eighth, to provide a Venturi means for producing a partial vacuum in the valve regulating vacuum chamber; ninth, to provide a vacuum and pressure actuated diaphragm in connection with a fluid regulator which diaphragm is adapted to be operatively connected with the discharge valve of the same in various ways, dependent upon the initial main pressure and the reduction of pressure desired in the service lines; tenth, to provide a fluid regulator of particularly great capacity which will hold the fluid in the pipe-lines at a constant pressure regardless of the volume of fluid drawn or consumed up to its capacity; eleventh, to provide as a whole, novelly constructed fluid regulators of this class, and twelfth, to provide such regulators which are very simple and economical of construction proportionate to their functions, durable, reliable, flexible, readily responsive to various pressures, and which will not readily deteriorate or get out of order.

Figure 4:
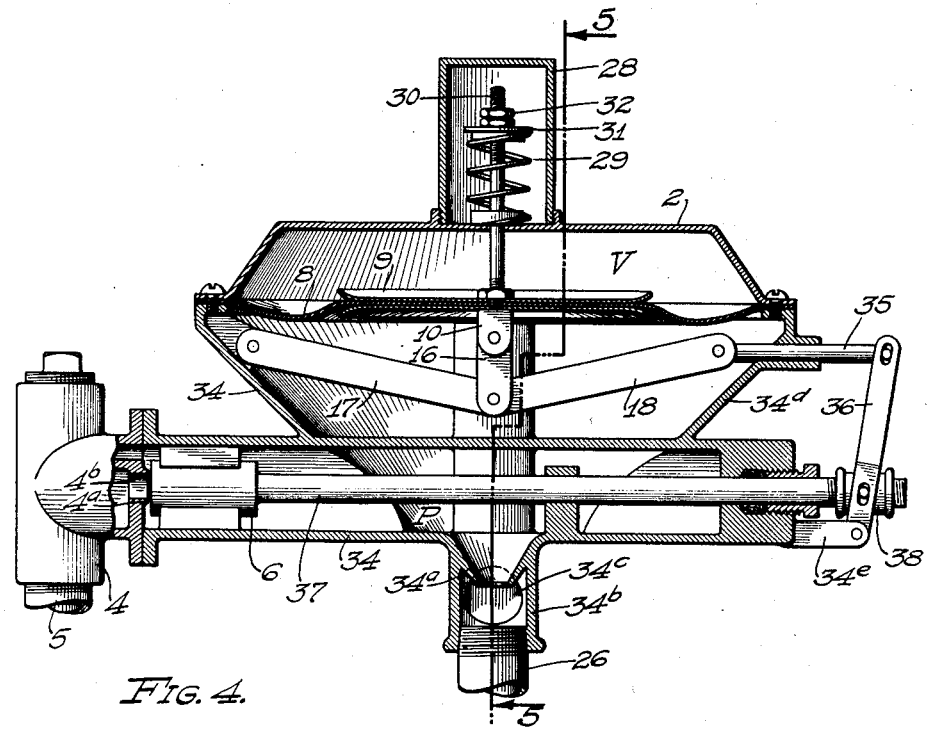
Figure 5:
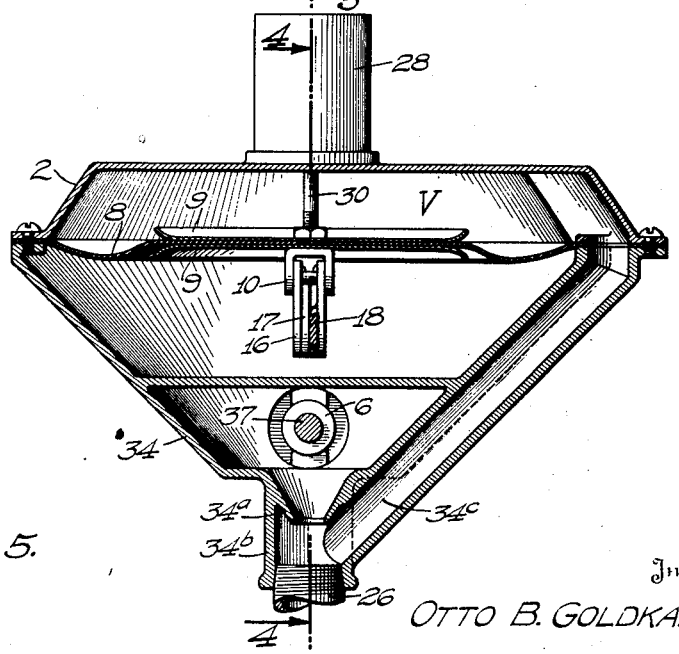
Figure 6:
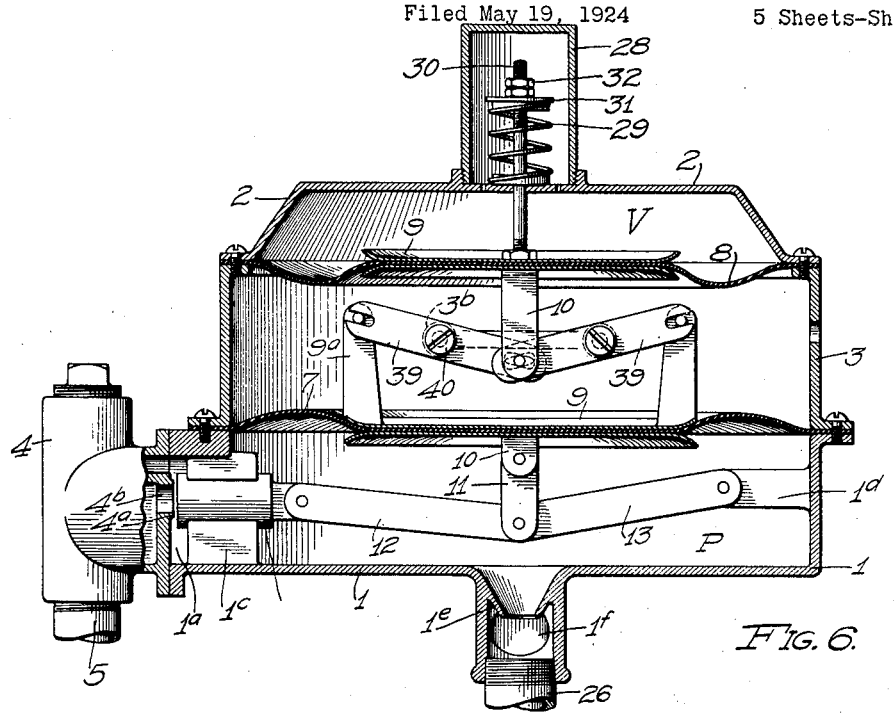
Figure 7:
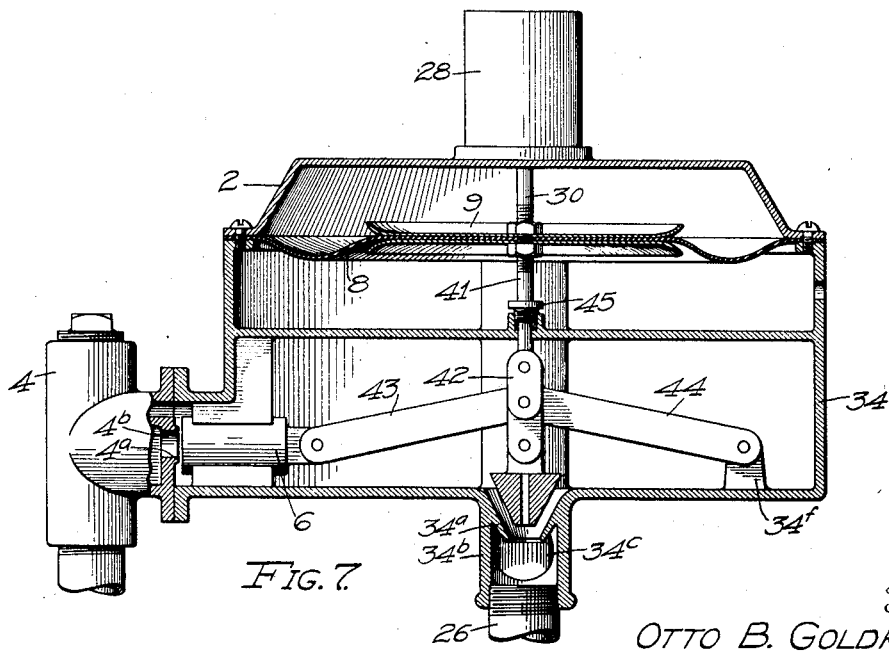
Figure 8:
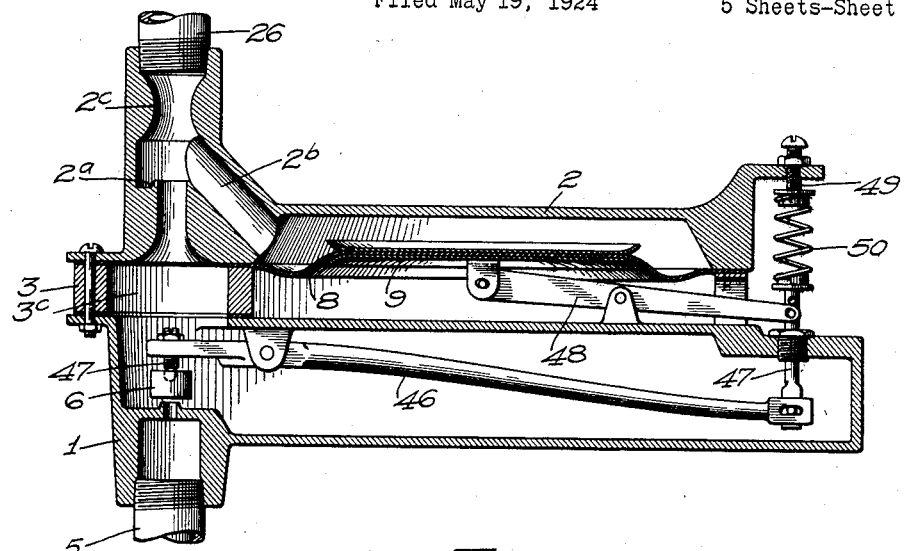
Figure 9:
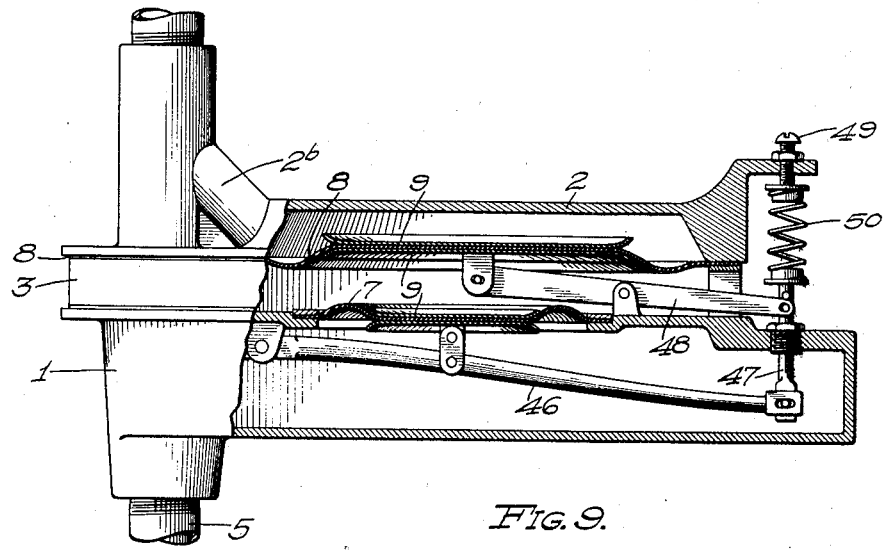

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a sectional elevational view of one form of construction of my fluid regulator with the section taken through the middle thereof, showing certain parts and portions thereof in elevation to facilitate the illustration; Fig. 2 is a partial plan and partial sectional view thereof with the view taken at 2—2 of Fig. 1; Fig. 3 is a transverse sectional view of the valve structure thereof with the section taken through 3—3 of Fig. 1; Fig. 4 is a sectional elevational view of another form of construction of my regulator with the section taken through the middle thereof and showing certain parts and portions in elevation to facilitate the illustration; Fig. 5 is a sectional elevational view of the regulator shown in Fig. 4 with the section taken through 5—5 thereof; Fig. 6 is a sectional elevational view of another form of construction of my regulator with the section taken through the middle thereof, showing also certain parts and portions in elevation; Fig. 7 is another form of construction of my regulator, particularly adapted for reducing the pressure of fuel gas in main service lines, with the section taken through the middle thereof and showing certain parts and portions in elevation; Fig. 8 is another slightly different form of construction of my regulator, showing a lever connection between the vacuum and pressure actuated diaphragm and the discharge valve, and Fig. 9 is still another slightly different form of construction of my regulator similar to that shown in Fig. 8, but provided with an auxiliary volume and pressure actuated diaphragm, with the section taken through the middle thereof, showing also certain parts and portions in elevation to facilitate the illustration.

Like characters of reference refer to similar parts and portions throughout the several views of the drawings.

My fluid regulators, as illustrated in the drawings and as will be described hereafter, are particularly adapted for regulating the pressure and volume of fuel gas in pipe-lines for consumption.

The main enclosure of my gas regulator, shown in Figs. 1, 2 and 3 of the drawings, consists of the pressure chamber member 1, the vacuum chamber 2 and the casing member 3, the latter being positioned between the members 1 and 2. In the member 1 are provided inlet and outlet openings 1ª and 1ᵇ, respectively. To the inlet portion of the member 1 is secured the T fitting 4, which is connected with the inlet or supply conductor 5. At the inlet portion of the chamber member 1 is positioned a gas regulating valve member 6, which is reciprocally mounted in guide portions 1ᶜ extending inwardly from the walls of the member 1. Said valve member 6 is adapted, when closed, to engage a seat portion 4ª extending toward said valve member from the wall of the fitting 4, there being provided an opening 4ᵇ, at the middle of the seat portion, communicating with the interior of said fitting. Between the members 1 and 3, and 3 and 2 are positioned and secured valve actuating diaphragms 7 and 8, respectively, which serve also as gaskets between said members. At the middle portions of the upper and the lower sides of the diaphragms 7 and 8 are secured the circular diaphragm plates 9, which are provided with outwardly turned outer edges. The plate 9 on the under side of the diaphragm 7 is provided with a downwardly extending lug 10, which is pivotally connected, by means of the links 11, with the inner ends of the toggle members 12 and 13, the opposite ends of the toggle members 12 being pivotally connected with the one end of the valve member 6, and the other toggle members 13 being pivotally connected with the valve actuating rod 14, reciprocally mounted in the stuffing box member 15 positioned in the side wall of the chamber member 1 at the side opposite the inlet portion thereof. The lug 10, secured to the plate 9 on the under side of the diaphragm 8, is pivotally connected by means of the links 16 with the inner ends of the toggle members 17 and 18, the toggle members 17 being pivotally mounted at their opposite ends on a lug on the inside of the side wall of the casing member 3. The toggle member 18 is pivotally connected at its opposite end with an arm 19 extending outwardly from and adjustably mounted on the valve actuating rod 14 at the portion thereof extending outwardly from the chamber member 1. At the outwardly extended end of the rod 14 is secured the stop and guide member 20, which is reciprocally mounted in the bearing 21 and is adapted to engage an adjustable stop screw 22 when the rod 14 is forced outwardly a predetermined distance.

At the outlet opening 1ᵇ of the pressure chamber member 1 is connected the discharge conductor 23, which is provided with an injector nozzle 24. Said injector nozzle is screwably secured at the one run end of the Y-fitting 25, which is connected at its other run end with the service pipe 26. The side outlet of the Y-fitting is connected by means of the conductor 27 with the vacuum chamber V, between the vacuum chamber member 2 and the diaphragm 8. This injector nozzle together with the Y-connection of the fitting 25 provides a Venturi means for increasing the flow of gas and producing a corresponding partial vacuum in the vacuum chamber V connected therewith.

At the upper portion of the vacuum chamber member 2 is provided a spring casing 28 in which is positioned a compression spring 29 through which extends the diaphragm balancing rod 30. Said rod is provided near its upper end with a spring retaining collar 31 and a pair of lock nuts 32 for adjusting the compression of the spring 29.

To the wall of the casing member 3 is secured an inwardly extending lug 3ª in which is mounted a stop screw 33, which extends through an elongated slot in the toggle member 18 and which is provided at its lower end with a stop member 33ª adapted to limit the downward movement of said toggle member.

When the fuel gas or other fluid in the service pipe 26 is being consumed, the gas passing through the injector nozzle 24 causes a partial vacuum around the outer portion of said nozzle, which causes a corresponding partial vacuum in the vacuum chamber V, causing the atmospheric pressure within the casing member 3, connected with the atmosphere, to force the diaphragm 8 upwardly, aided in said movement by means of the compression spring 29 adapted to neutralize the weight of the diaphragm and other members secured thereto. The upward movement of said diaphragm causes the toggle members 18 to be raised at their inner ends, forcing the arm 19 and, therefore, the rod 14 outwardly, which removes the valve member 6 from its seat. As the consumption in the pipe 26 increases, the diaphragm 8 is correspondingly forced upwardly, moving the valve member 6 farther from its seat. As the volume and the pressure of the gas in the pressure chamber P increases, by reason of the large opening between the valve member 6 and its seat, the diaphragm 7 is forced upwardly tending to close the valve member 6 slightly, therefore, modifying the action of the diaphragm 8. The stop member 33ª is adapted to prevent the toggle members 17 and 18 from engaging with the upper plate of the diaphragm 7 and also to prevent the toggle members 12 and 13 from engaging with the lower wall of the chamber member 1. When the flow of gas in the pipe 26 is reduced or shut off, the vacuum in the vacuum chamber V is decreased, changing the vacuum to pressure when the consumption is shut off, thus forcing the diaphragm 8 downwardly as well as the diaphragm 7 upwardly, producing a double action tending to close the valve member 6 against its seat.

In the regulator shown in Figs. 4 and 5 of the drawings the chamber member 1 and the casing 3 are combined in one member 34, and only one diaphragm 8 is employed. The combined pressure chamber member and casing 34, in this latter form of construction, is provided with an integral injector nozzle 34ª at its lower portion which communicates with the interior of a hollow, downwardly projecting portion 34ᵇ to which is secured the service pipe 26. The member 34 is provided with an angularly positioned conductor 34ᶜ, cast integrally therewith, which communicates at its one end with the hollow portion 34ᵇ at a portion near the end of the injector nozzle 34ª, substantially as shown in Figs. 4 and 5 of the drawings. The other end of the conductor 34ᶜ communicates with the interior of the vacuum chamber V, formed between the chamber member 2 and the diaphragm 8, outside of the main portion thereof, as shown best in Fig. 5. The toggle member 18 in this latter form of construction is pivotally connected at its outer end with the inner end of a rod 35 reciprocally mounted in the wall of the upper portion of the member 34 forming the air compartment and enclosing the toggle members. The compartment in which said toggle members are positioned communicates with the atmosphere by means of a port or ports 34ᵈ in the wall of the member 34. The outwardly extended end of the rod 35 is pivotally connected with the one end of a lever 36 which is pivotally mounted on a lug 34ᵉ at the lower end of the member 34. The valve member 6 is provided with a rod 37 which extends through the pressure chamber P and outer wall of the member 34, and is provided at its outwardly extended end with a valve adjusting member 38 which is pivotally connected at its opposite sides, intermediate the ends of the lever 36.

Thus it will be seen that as the fuel gas or other fluid in the service pipe 26 is being consumed, a partial vacuum will be formed in the vacuum chamber V, causing the diaphragm 8 to be forced upwardly by reason of atmospheric pressure on the under side of the same, forcing the rod 35 outwardly, causing the valve member 6 to be withdrawn from its seat. The combined action of the lever 36 and the toggle members 17 and 18 causes a considerable force to be exerted by the valve member 6 against its seat, resulting in an effective seal when no gas is used.

In Fig. 6 of the drawings I have shown another double-diaphragm gas regulator in which the lower diaphragm 7, forming the upper wall of the pressure chamber of the member 1, is pivotally connected, by means of upwardly extending lugs 9ª secured to the upper diaphragm plate 9, to the outer ends of toggle members 39 which are pivotally mounted intermediate their ends, by means of screws 40, on lugs 3ᵇ extending inwardly from the wall of the casing member 3. Said casing member 3, in this latter form of construction, is also positioned between the chamber members 1 and 2, as described in connection with the structure shown in Figs. 1, 2 and 3. The inner ends of the toggle members 39 are pivotally connected to the lug 10 extending downwardly from the lower plate of the diaphragm 8. There are provided longitudinal slots at both ends of each of the toggle members 39 to permit free movement of the same at their connections with the lugs 9ª and the lug 10. Within the pressure chamber P are positioned the toggle members 12 and 13, which are pivotally connected at their inner ends, by means of the link 11, with a lug 10 extending downwardly from the plate 9 at the under side of the diaphragm 7. The toggle member 12 is pivotally connected at its outer end with the valve member 6, while the toggle member 13 is pivotally mounted at its outer end on a lug 1ᵈ extending inwardly from the wall of the chamber member 1. The chamber member 1 is also provided, in the wall at its under side, with an outwardly extending injector nozzle 1ᵉ which communicates with the service pipe 26, as described in connection with the structure shown in Figs. 4 and 5. In this latter form of construction there is also provided a conductor 1ᶠ which communicates angularly, at its lower end, with the portion surrounding the end of the injector nozzle, and which communicates at its other end with the vacuum chamber V.

The action of the diaphragm 8 in its latter form of construction is positive with relation to the closing of the valve member 6 against its seat, but is adapted to be modified in its action by the diaphragm 7 when the volume and pressure of the gas in the pressure chamber become excessive.

The regulator shown in Fig. 7 of the drawings is particularly adapted to be inserted in a main pipe-line for reducing pressure from 50 to 100 pounds to approximately 4 pounds. In this construction only one diaphragm 8 is used which is positioned between the vacuum chamber member 2 and the chamber member 34, the latter member being similar to that shown in Figs. 4 and 5. In this latter form of construction the diaphragm 8 is directly connected, by means of the rod 41, with the one end of a link 42, which is pivotally connected at its opposite end with the inner ends of the toggle members 43 and 44, the toggle member 43 being pivotally connected with the one end of the valve member 6 and the other toggle member being mounted at its opposite end on a lug $34^f$ within the pressure chamber of the member 34. The wall of the member 34 separating the pressure chamber thereof from the compartment communicating with the atmosphere is preferably provided with a stuffing box 45, through which the rod 41 extends.

The regulators shown in Figs. 8 and 9 of the drawings illustrate a lever actuated valve means. In these latter structures the valve member 6 is mounted, by means of a ball and socket joint, at the end of a bolt 47 secured at the short end of the lever 46 which is pivotally mounted intermediate its ends on a lug within the chamber member 1. The opposite end of the lever 46 is pivotally connected to the one end of a rod 47 which extends through the wall of said chamber member and is pivotally connected at the portion extending outwardly from said chamber member to a lever 48. Said last mentioned lever is pivotally mounted intermediate its ends on a lug extending upwardly from the chamber member 1, and is pivotally connected at its opposite end with a lug extending downwardly from the lower plate 9 of the diaphragm 8. Said diaphragm is secured between a vacuum chamber member 2 and a casing member 3, as described in connection with certain of the other structures. Between the upper end of the rod 47, positioned outwardly from the casing member 1, and the one end of the adjusting screw 49, secured in an outwardly extending portion of the chamber member 2, is positioned a compression spring 50 which is adapted to counterbalance the weight of the diaphragm 8 and the members secured thereto. In the latter regulators the inlet and outlet pipes or conductors are in substantially direct alinement with each other to reduce the resistance of gas flow to a minimum. The injector nozzle $2^a$ in this construction is positioned within and to one side of the chamber member 2 and communicates by means of a passage $3^c$ in the casing member 3 with the interior of the chamber member 1. The end of the nozzle $2^a$ extends into a chamber which communicates, by means of an angularly positioned passage $2^b$, with the interior of the vacuum chamber V of the member 2. In the passage connecting the end of the injector nozzle $2^a$ with the service pipe 26 is provided a reduced portion or venturi $2^c$ adapted to accelerate the flow of gas from the end of the injector nozzle.

The structure, as shown in Fig. 9 of the drawings, shows another diaphragm 7 pivotally connected to the lever 46 between its pivotal mounting and the end connected with the rod 47. Said latter diaphragm serves to modify, to a certain extent, the action of the diaphragm 8 to close the valve against its seat.

It is obvious from this construction, as illustrated in the drawings and disclosed in the foregoing specification, that there are provided fluid regulators particularly adapted for regulating the pressure, volume and flow of fuel gas in gas mains and individual service pipes, as aimed at and set forth in the objects of the invention, and though I have shown and described certain particular constructions, combinations and arrangements, of parts and portions of gas regulators, I do not wish to be limited to these particular constructions, combinations and arrangements, but desire to include in the scope of my invention the constructions, combinations and arrangements substantially as set forth in the appended claims.

Having thus described my invention, what I claim as new and desire to secure by Letters Patent, is:

1. In a fluid regulator, a fluid conducting means, a valve member shiftably mounted therein, a Venturi means positioned in said fluid conducting means, a vacuum chamber member provided on one side with a diaphragm whose axis is disposed at right angles to the axis of said valve member, the interior of said chamber member communicating with said fluid conducting means at said Venturi means, lever and link means operatively connecting said diaphragm with said valve member, a pressure chamber member communicating with said fluid conducting means between said valve member and said Venturi means and provided on one side with a diaphragm in spaced parallel relation with said first diaphragm, and a link means connecting said last mentioned diaphragm with said lever and link means.

2. In a fluid regulator, a fluid conducting means, a valve member shiftably mounted therein, a Venturi means positioned in said fluid conducting means, a vacuum chamber member provided on one side with a diaphragm, the interior of said chamber member communicating with said fluid conducting means at said Venturi means, a means connecting said diaphragm with said valve member, a pressure chamber member provided on one side with a diaphragm, the interior of said pressure chamber member communicating with said fluid conducting means between said valve member and said Venturi means, means operatively connecting said last mentioned diaphragm with said valve member, and a spring means operatively connected with said first mentioned diaphragm for counterbalancing the weight of the same and the members connected thereto.

3. In a fluid pressure regulator, a fluid conducting means, a valve positioned in said conducting means, an injector nozzle positioned in said conducting means, a vacuum chamber member provided with a flexible diaphragm subjected on one side to atmospheric pressure, a conductor connecting the interior of said vacuum chamber member by an angular passage with said conducting means at said injector nozzle, a toggle and link means operatively connecting said diaphragm with said valve, a pressure chamber member provided with a flexible diaphragm subjected on one side to atmospheric pressure, the interior of said pressure chamber member communicating with said conducting means between said valve and said injector nozzle, and a link means connecting said last mentioned diaphragm with said toggle and link means.

4. In a fluid pressure regulator, a fluid conducting means, a valve positioned in said conducting means, an injector nozzle positioned in said conducting means, a vacuum chamber member provided with a flexible diaphragm subjected on one side to atmospheric pressure, a conductor connecting the interior of said vacuum chamber member by an angular passage with said conducting means at said injector nozzle, a means operatively connecting said diaphragm with said valve, a pressure chamber member provided with a flexible diaphragm subjected on one side to atmospheric pressure, the interior of said pressure chamber member communicating with said conducting means between said valve and said injector nozzle, means operatively connecting said last mentioned diaphragm with the means connected to said valve, and a spring means operatively connected with said first mentioned diaphragm for counterbalancing the weight of the same and the members connected thereto.

5. In a fluid regulator, a pressure chamber provided with fluid inlet and outlet openings, a valve means reciprocally movable in one of said openings, a vacuum producing means connected to the other opening, a vacuum chamber superposed on said pressure chamber, a diaphragm supported therein, the axis of said diaphragm being substantially vertical to the axis of said valve, a rod and toggle means operatively connecting said diaphragm with said valve means, said diaphragm being exposed on one side to atmospheric pressure.

6. In a fluid regulator, a pressure chamber member, fluid inlet and outlet openings therein, a valve member positioned in one of said openings, vacuum producing means connected to the other opening, a vacuum chamber member superposed on said pressure chamber member, a diaphragm secured to the lower margin of said latter chamber member, spacing means separating said diaphragm from the pressure chamber member and forming an intermediate atmospheric pressure chamber therewith, and rod and toggle means connecting said diaphragm with said valve.

7. In a fluid regulator, a pressure chamber member provided with fluid inlet and outlet openings, a valve means in one of said openings, vacuum producing means at the other of said openings, a vacuum chamber member superposed on said pressure chamber member, a diaphragm secured to the upper margin of said pressure chamber member, a second diaphragm secured to the lower margin of said vacuum chamber member in spaced apart parallel relation with said first diaphragm, a central spacing member forming an atmospheric pressure chamber between said diaphragms, and toggle means associated with said diaphragm operatively connected with said valve.

8. In a fluid regulator, a pressure chamber member provided with fluid inlet and outlet openings, a valve positioned in one of said openings, a vacuum producing means connected with the other of said openings, a vacuum chamber member superposed on said pressure chamber member, a spacing member positioned between said pressure and vacuum member, a diaphragm supported in between the upper margin of said pressure chamber member and said spacing member, a second diaphragm supported between the lower margin of said vacuum member and said spacing member, said diaphragm forming with said spacing member an intermediate atmospheric pressure chamber, an adjustable spring means supported on said vacuum chamber member for balancing the weight of said second diaphragm and actuating means connecting said diaphragms with said valve.

In testimony whereof, I have hereunto set my hand at San Diego, California, this 29th day of April, 1924.

OTTO B. GOLDKAMP.